United States Patent [19]
Rodriguez

[11] Patent Number: 5,640,990
[45] Date of Patent: Jun. 24, 1997

[54] FLEXIBLE CONDUIT FAILURE SAFETY VALVE

[76] Inventor: Aristides Rodriguez, 367 W. 17th St., Hialeah, Fla. 33010

[21] Appl. No.: 453,455

[22] Filed: May 30, 1995

[51] Int. Cl.⁶ ............................................. F16K 17/40
[52] U.S. Cl. ........................... 137/68.14; 137/68.18; 137/456
[58] Field of Search ................. 137/68.14, 68.18, 137/456, 492.5, 554

[56] References Cited

U.S. PATENT DOCUMENTS

| | | | |
|---|---|---|---|
| 1,780,387 | 11/1930 | Hart | 137/68.14 |
| 2,081,542 | 5/1937 | Kidney | 137/456 X |
| 2,962,044 | 11/1960 | Charboneau | 137/456 |
| 3,630,216 | 12/1971 | Kelly | 137/456 X |
| 3,744,505 | 7/1973 | Huvey et al. | 137/68.14 |

*Primary Examiner*—John Rivell

[57] ABSTRACT

A safety valve for precluding leakage of a fluid from a ruptured conduit. The inventive device includes a sensing conduit having a center bore and a matrix of bores concentrically positioned about the center bore. A valve is positioned in fluid communication with the center bore of the sensing conduit and normally permits passage of hydraulic fluid therethrough. A pneumatic actuator is mechanically coupled to the valve and fluidly communicates with the matrix of bores in the sensing conduit. The pneumatic actuator and the matrix of bores can be pneumatically pressurized such that a rupturing of the sensing conduit will effect closure of the valve to permit continued operation of a remainder of a hydraulic system.

6 Claims, 3 Drawing Sheets

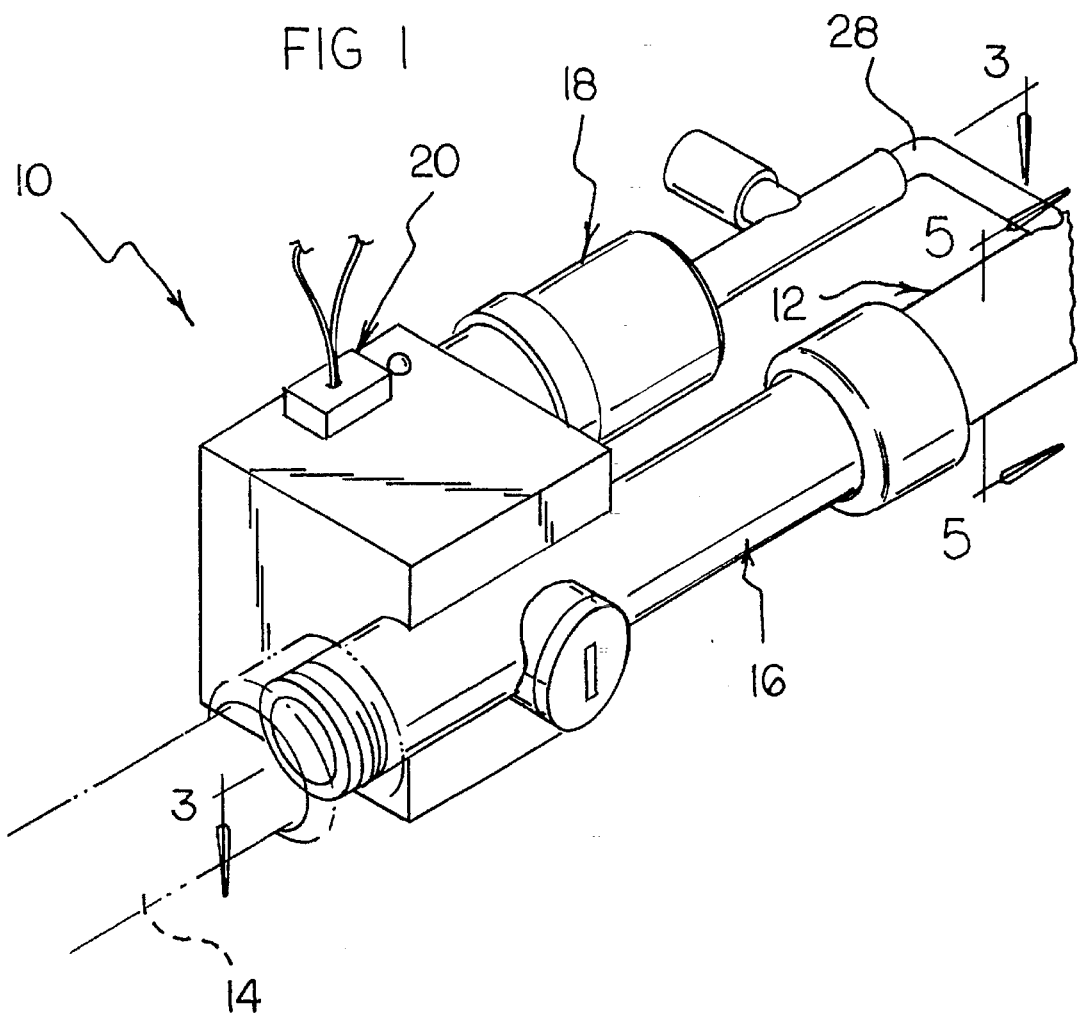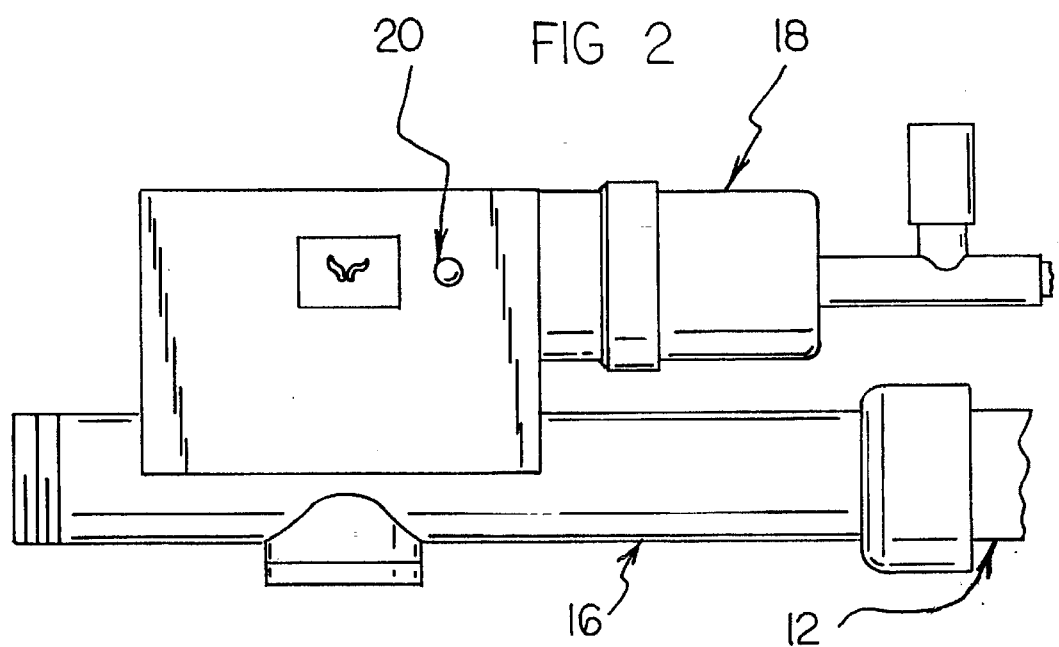

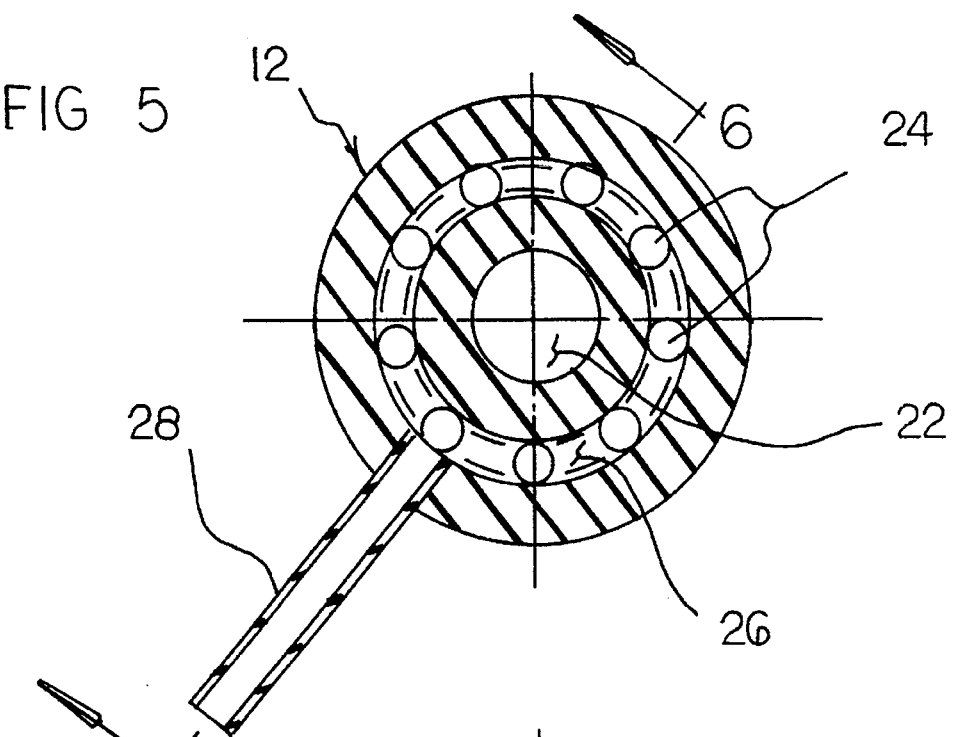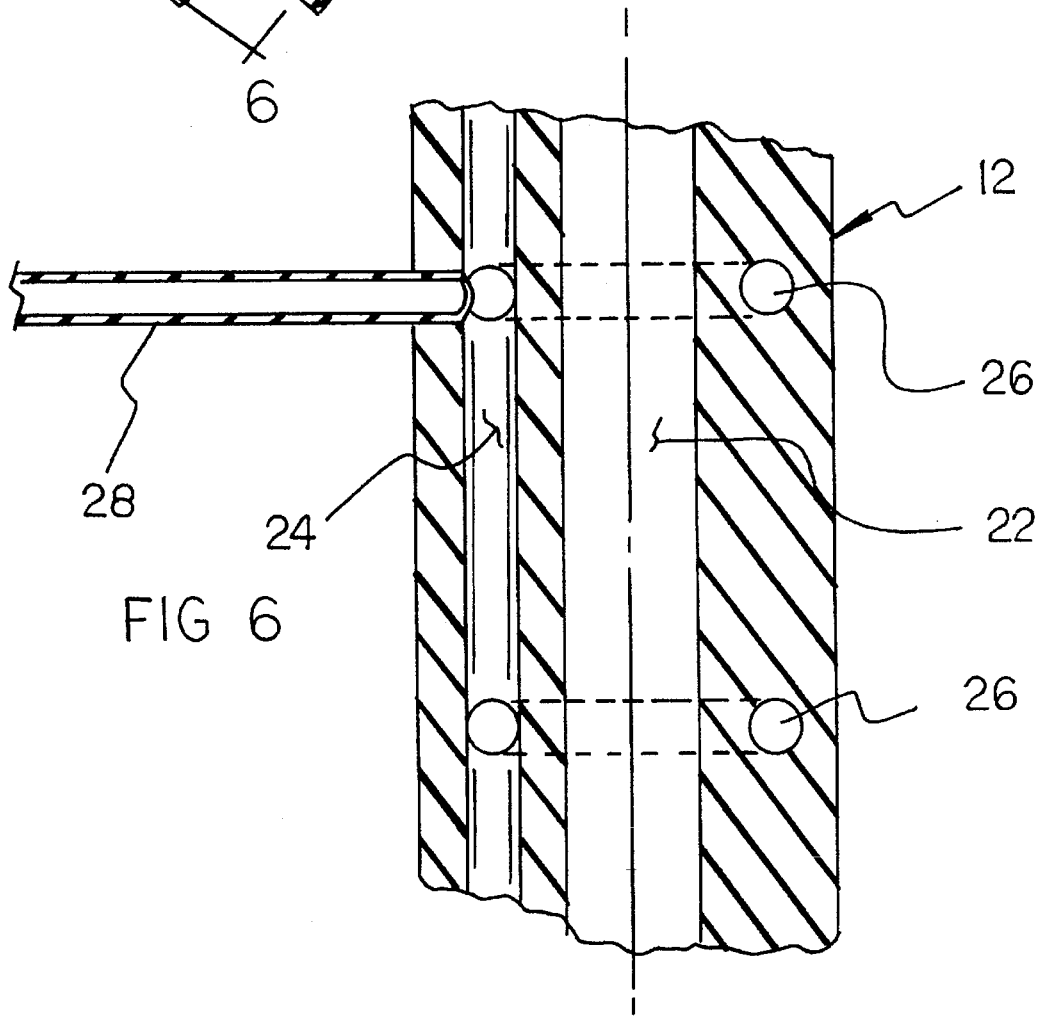

FLEXIBLE CONDUIT FAILURE SAFETY VALVE

BACKGROUND OF THE INVENTION

1. Field of the Invention

The present invention relates to automatic valve structures and more particularly pertains to a flexible conduit failure safety valve for precluding leakage of a fluid from a ruptured conduit.

2. Description of the Prior Art

The use of automatic valve structures is known in the prior art. More specifically, automatic valve structures heretofore devised and utilized are known to consist basically of familiar, expected and obvious structural configurations, notwithstanding the myriad of designs encompassed by the crowded prior art which have been developed for the fulfillment of countless objectives and requirements.

While the prior art fulfills their respective, particular objectives and requirements, the prior art does not disclose a flexible conduit failure safety valve for precluding leakage of a fluid from a ruptured conduit which includes a sensing conduit having a center bore and a matrix of bores, a valve positioned in fluid communication with the center bore normally permitting passage of hydraulic fluid therethrough, and a pneumatic actuator mechanically coupled to the valve and fluidly communicating with the matrix of bores in the sensing conduit, wherein the pneumatic actuator and the matrix of bores can be pneumatically pressurized such that a rupturing of the sensing conduit will effect closure of the valve to permit continued operation of a remainder of a hydraulic system.

In these respects, the flexible conduit failure safety valve according to the present invention substantially departs from the conventional concepts and designs of the prior art, and in so doing provides an apparatus primarily developed for the purpose of precluding continued leakage of a fluid from a ruptured conduit.

SUMMARY OF THE INVENTION

In view of the foregoing disadvantages inherent in the known types of automatic valve structures now present in the prior art, the present invention provides a new flexible conduit failure safety valve construction wherein the same can be utilized for discontinuing fluid flow through a ruptured conduit. As such, the general purpose of the present invention, which will be described subsequently in greater detail, is to provide a new flexible conduit failure safety valve apparatus and method which has many of the advantages of the automatic valve structures mentioned heretofore and many novel features that result in a flexible conduit failure safety valve which is not anticipated, rendered obvious, suggested, or even implied by any of the prior art automatic valve structures, either alone or in any combination thereof.

To attain this, the present invention generally comprises a safety valve for precluding leakage of a fluid from a ruptured conduit. The inventive device includes a sensing conduit having a center bore and a matrix of bores concentrically positioned about the center bore. A valve is positioned in fluid communication with the center bore of the sensing conduit and normally permits passage of hydraulic fluid therethrough. A pneumatic actuator is mechanically coupled to the valve and fluidly communicates with the matrix of bores in the sensing conduit. The pneumatic actuator and the matrix of bores can be pneumatically pressurized such that a rupturing of the sensing conduit will effect closure of the valve to permit continued operation of a remainder of a hydraulic system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new flexible conduit failure safety valve apparatus and method which has many of the advantages of the automatic valve structures mentioned heretofore and many novel features that result in a flexible conduit failure safety valve which is not anticipated, rendered obvious, suggested, or even implied by any of the prior art automatic valve structures, either alone or in any combination thereof.

It is another object of the present invention to provide a new flexible conduit failure safety valve which may be easily and efficiently manufactured and marketed.

It is a further object of the present invention to provide a new flexible conduit failure safety valve which is of a durable and reliable construction.

An even further object of the present invention is to provide a new flexible conduit failure safety valve which is susceptible of a low cost of manufacture with regard to both materials and labor, and which accordingly is then susceptible of low prices of sale to the consuming public, thereby making such flexible conduit failure safety valves economically available to the buying public.

Still yet another object of the present invention is to provide a new flexible conduit failure safety valve which provides in the apparatuses and methods of the prior art some of the advantages thereof, while simultaneously overcoming some of the disadvantages normally associated therewith.

Still another object of the present invention is to provide a new flexible conduit failure safety valve for precluding continued leakage of a fluid from a ruptured conduit.

Yet another object of the present invention is to provide a new flexible conduit failure safety valve which includes a sensing conduit having a center bore and a matrix of bores, a valve positioned in fluid communication with the center bore normally permitting passage of hydraulic fluid therethrough, and a pneumatic actuator mechanically coupled to the valve and fluidly communicating with the matrix of bores in the sensing conduit, wherein the pneumatic actuator and the matrix of bores can be pneumatically pressurized such that a rupturing of the sensing conduit will effect closure of the valve to permit continued operation of a remainder of a hydraulic system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a flexible conduit failure safety valve according to the present invention in use.

FIG. 2 is a top plan view of the invention, per se.

FIG. 5 is a cross-sectional view taken along line 5—5 of FIG. 1.

FIG. 6 is a cross-sectional view taken along line 6—6 of FIG. 5.

DESCRIPTION OF THE PREFERRED EMBODIMENT

Figure 3:
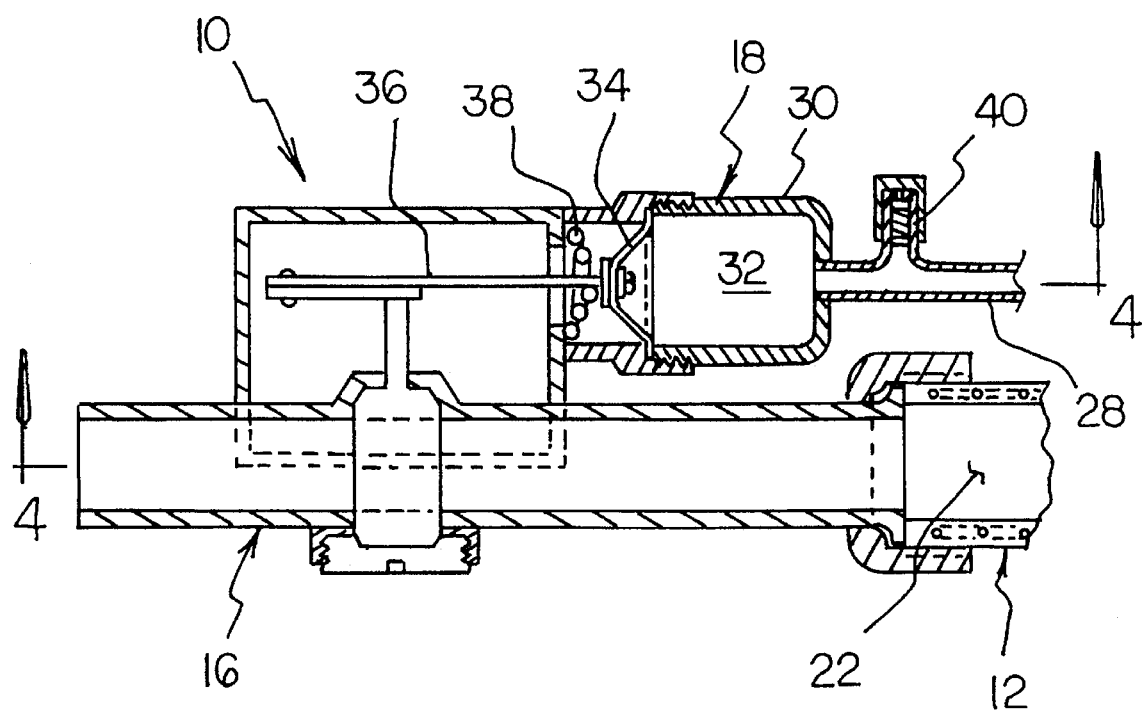
FIG. 3 is a cross-sectional view taken along line 3—3 of FIG. 1.

With reference now to the drawings, and in particular to FIGS. 1–6 thereof, a new flexible conduit failure safety valve embodying the principles and concepts of the present invention and generally designated by the reference numeral 10 will be described.

More specifically, it will be noted that the flexible conduit failure safety valve 10 comprises a sensing conduit 12 for positioning into fluid communication with a fluid line 14 of a hydraulic system, such as a braking system commonly found on a conventionally known automobile. A valve 16 is positioned in fluid communication with the sensing conduit 12 for selectively permitting fluid communication between the fluid line 14 of the hydraulic system and the sensing conduit. A pneumatic actuator 18 is mechanically coupled to the valve 16 and positioned in fluid communication with the sensing conduit 12 such that a rupturing of the sensing conduit will cause the pneumatic actuator 18 to close the valve 16 so as to preclude continued leakage of hydraulic fluid from the fluid line 14 through the sensing conduit 12. By this structure, a failure of the sensing conduit 12 will cause the valve 16 to close, thereby permitting continued operation of the associated hydraulic system absent the components serviced by the sensing conduit 12. When the present invention 10 is utilized in conjunction with an automobile brake hydraulic system, the failure of the sensing conduit 12 which normally provides a flexible coupling between the hydraulic system and an individual hydraulic brake actuator of a wheel will not cause a complete failure of the hydraulic system inasmuch as the valve 16 precludes further leakage of hydraulic fluid from the fluid line 14.

As shown in FIGS. 1 and 2, the present invention may further comprise an indicator means 20 for sensing an actuation of the valve 16 to alert an individual to the presence of a failed sensing conduit 12 of the present invention 10.

Referring now to FIGS. 3 through 6 wherein the present invention 10 is illustrated in detail, it can be shown that the sensing conduit 12 comprises an elongated flexible cylindrical member having a center bore 22 directed therethrough. The center bore 22 is positioned in fluid communication with the valve 16, as shown in FIG. 3 and extends therefrom to ultimately couple with a hydraulic actuator such as a wheel cylinder or brake caliber. A plurality of longitudinal bores 24 extend longitudinally through the sensing conduit 12 and are positioned in an annular array concentrically positioned about the center bore 22. A plurality of annular bores 26 extend in a substantially spaced and parallel orientation relative to one another and are concentrically positioned about the center bore 22 so as to extend into fluid communication with each of the longitudinal bores 24. A transfer conduit 28 extends through a sidewall of the sensing conduit 12 and into fluid communication with the bores 24 and 26. By this structure, the longitudinal bores 24 and the annular bores 26 can be pneumatically pressurized, whereby a rupturing of the center bore 22 or an exterior of the sensing conduit 12 will alter a pneumatic pressure within the transfer conduit 28 which is fluidly coupled to the pneumatic actuator 18 so as to effect actuation thereof and subsequent closure of the valve 16.

As best illustrated in FIG. 3, it can be shown that the pneumatic actuator 18 preferably comprises an actuator body 30 positioned in fluid communication with the transfer conduit 28. The actuator body 30 includes a pneumatic chamber 32 having a diaphragm 34 extending thereacross. A linkage 36 is coupled to the diaphragm 34 and to the valve 16 and positions the valve in an open configuration against a force of a spring 38 engaging the linkage. An air injection valve 40 is positioned in fluid communication with the actuator body 30 so as to permit pressurization of the pneumatic chamber 32, the transfer conduit 28, the annular bores 26, and the longitudinal bores 24. Such pressurization of the pneumatic chamber 32 forces the diaphragm 34 outwardly against a force of the spring 38 to cause the linkage 36 to open the valve 16, thereby permitting normal operation of the hydraulic system by allowing hydraulic fluid to flow from the fluid line 14 through the valve 16 and into the center bore 22 of the sensing conduit 12. However, upon a rupturing of the sensing conduit 12, the pneumatic pressure within the pneumatic chamber 32 will decrease, thereby allowing the diaphragm 34 to be biased into the pneumatic chamber 32 by the spring 38 to close the valve 16 through the linkage 36.

Figure 4:
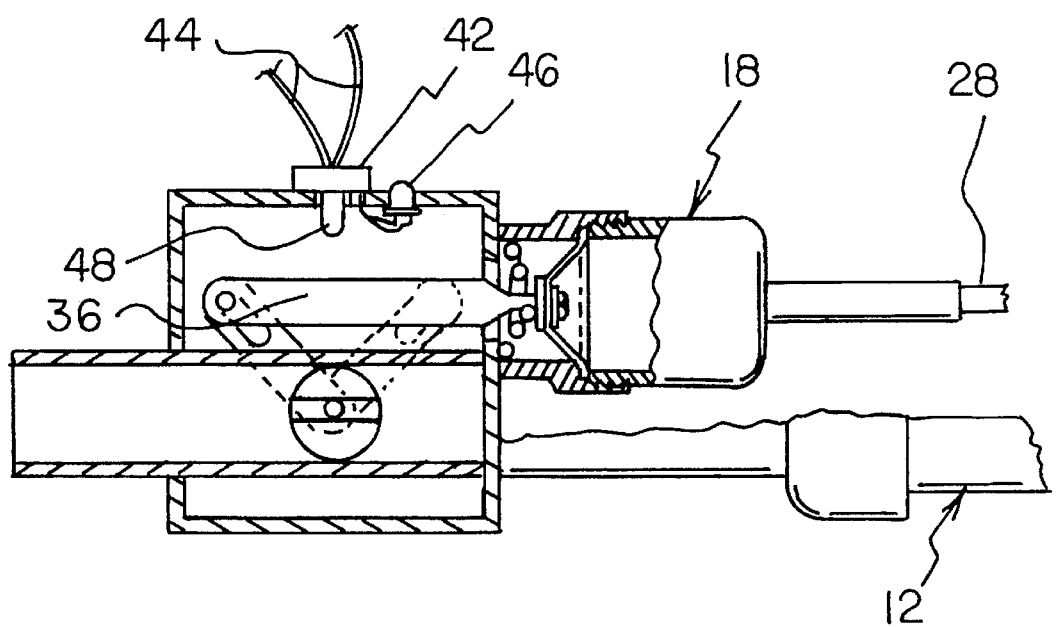
FIG. 4 is a cross-sectional view taken along line 4—4 of FIG. 3.

As best illustrated in FIG. 4, it can be shown that the indicator means 20 of the present invention 10 preferably comprises a switch 42 mounted in a spaced relationship relative to the linkage 36. The switch 42 receives electrical power from a battery or other power source through a plurality of wires 44 extending therefrom. An indicator light 46 can be mounted to the device 10, or alternatively positioned in a passenger or interior compartment of an associated vehicle. The indicator light 46 is positioned in electrical communication with the switch 42 such that actuation of the switch 42 will effect illumination of the indicator light 46. The switch 42 includes a depending actuator 48 positioned for engagement with a portion of the linkage 36 during closure of the valve 16. By this structure, a failure of the sensing conduit 12 will effect closure of the valve 16 through the linkage 36 which mechanically actuates the switch 42 to illuminate the indicator light 46 and alert the individual to a failure of the sensing conduit.

In use, the flexible conduit failure safety valve 10 of the present invention can be easily utilized for precluding continued leakage of fluid from a ruptured conduit 12. The present invention 10 is particularly useful in conjunction with an automobile hydraulic brake system such that continued operation of a remainder of the brake system is provided subsequent to breakage of a flexible sensing conduit 12 extending between a fluid line 14 of the brake system and a wheel cylinder or brake caliber thereof.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A flexible conduit failure safety valve comprising:

a sensing conduit for positioning into fluid communication with a fluid line of a hydraulic system;

a valve positioned in fluid communication with the sensing conduit for selectively permitting fluid communication between the fluid line of the hydraulic system and the sensing conduit;

a pneumatic actuator operatively coupled to the valve and positioned in fluid communication with the sensing conduit such that a rupturing of the sensing conduit will cause the pneumatic actuator to close the valve so as to preclude continued leakage of hydraulic fluid from the fluid line through the sensing conduit;

wherein the sensing conduit comprises an elongated flexible cylindrical member having a center bore directed therethrough, the center bore being positioned in fluid communication with the valve and extending therefrom for coupling to a hydraulic actuator, the sensing conduit including a matrix of bores positioned about the center bore, the matrix of bores being fluidly coupled to the pneumatic actuator.

2. The flexible conduit failure safety valve of claim 1, wherein the matrix of bores comprises a plurality of longitudinal bores extend longitudinally through the sensing conduit and positioned in an annular array extending concentrically about the center bore; and a plurality of annular bores extending in a substantially spaced and parallel orientation relative to one another and concentrically positioned about the center bore so as to extend into fluid communication with each of the longitudinal bores.

3. The flexible conduit failure safety valve of claim 2, wherein the pneumatic actuator comprises an actuator body positioned in fluid communication with the matrix of bores, the actuator body including a pneumatic chamber having a diaphragm extending thereacross; and a linkage coupled to the diaphragm and to the valve, wherein a rupturing of one of the bores of the sensing conduit will cause movement of the diaphragm to close the valve.

4. The flexible conduit failure safety valve of claim 3, wherein the pneumatic actuator further comprises a spring biasing the linkage so as to position the valve in a closed position, wherein the matrix of bores and the pneumatic chamber can be pressurized to force the diaphragm against the force of the spring to position the valve in an open position, wherein a rupturing of one of the bores will cause the spring to close the valve through the linkage.

5. The flexible conduit failure safety valve of claim 4, and further comprising an indicator means for sensing an actuation of the valve to alert an individual to a presence of a failed sensing conduit.

6. The flexible conduit failure safety valve of claim 5, wherein the indicator means comprises a switch mounted relative to the linkage, the switch being positionable into electrical communication with an electrical power source; an indicator light positioned in electrical communication with the switch, the switch including a depending actuator positioned for engagement with a portion of the linkage moving during closing of the valve, wherein a closing of the valve causes the linkage to engage the depending actuator to actuate the switch so as to actuate the indicator light.

* * * * *